Figure 7:
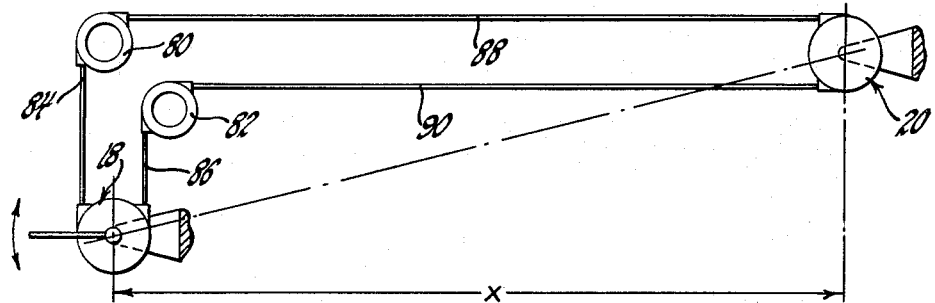

May 18, 1965  A. S. MATZ  3,183,737
EXPANSION COMPENSATED CONTROL SYSTEM
Filed May 14, 1962  3 Sheets-Sheet 1
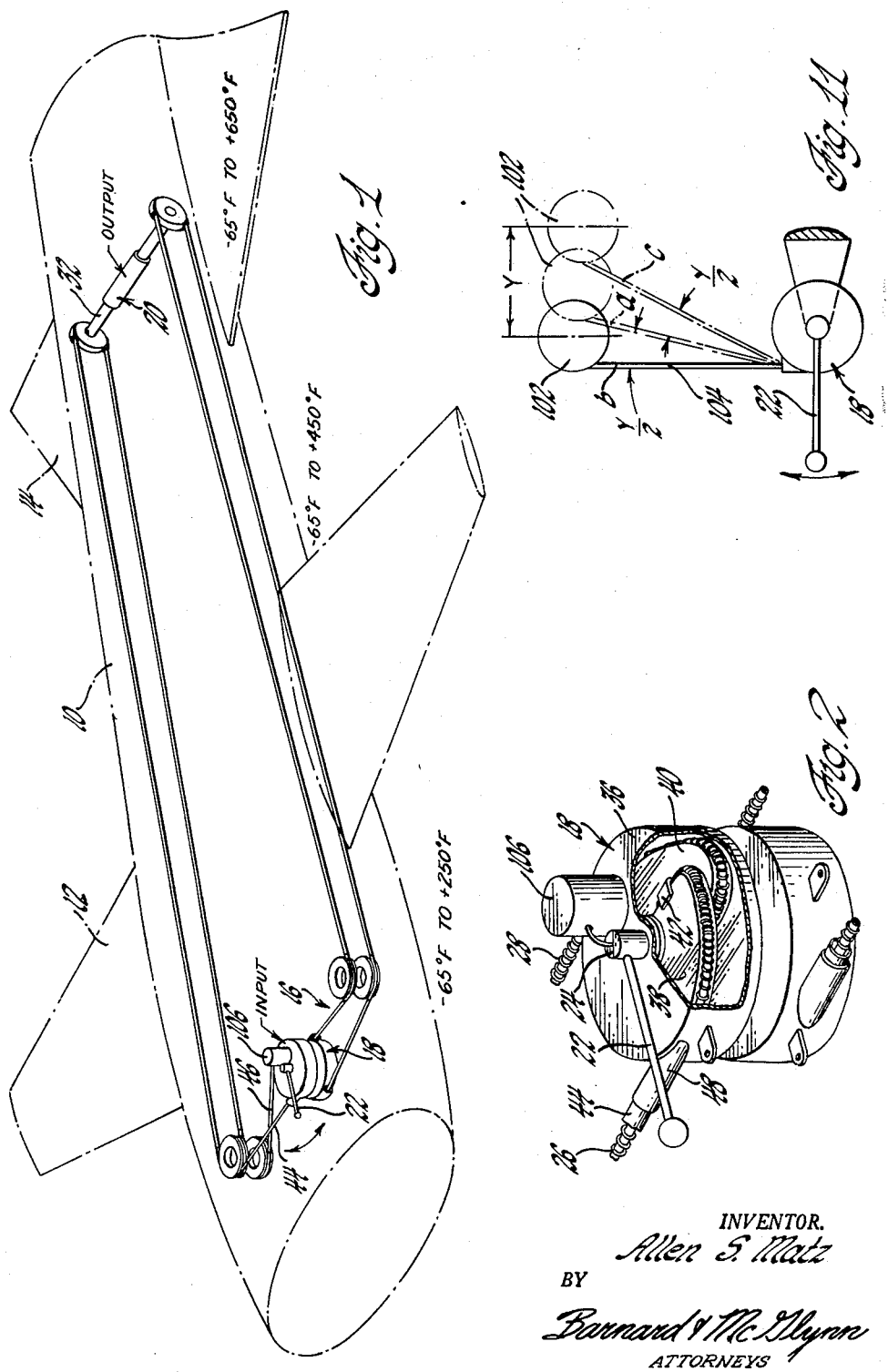
INVENTOR.
Allen S. Matz
BY
Barnard & McGlynn
ATTORNEYS

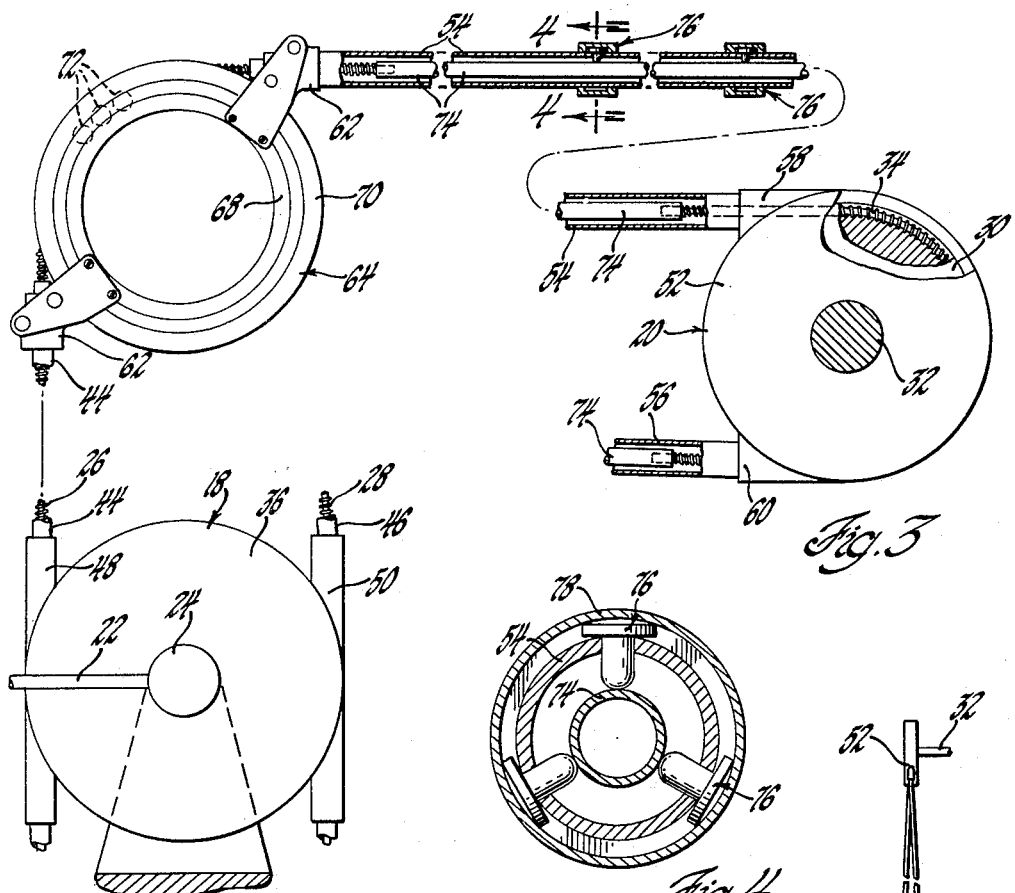
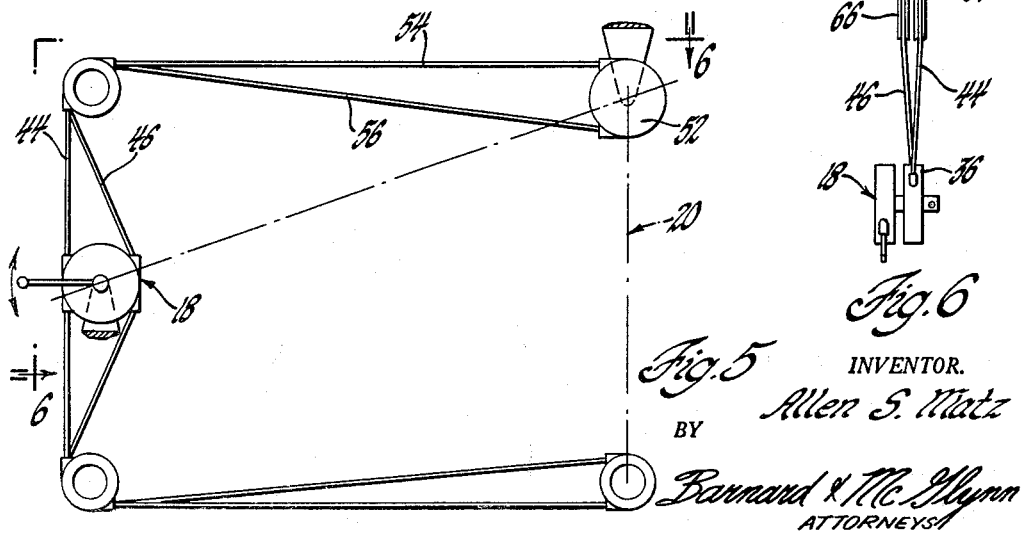

INVENTOR.
Allen S. Matz
BY
Barnard & McGlynn
ATTORNEYS

United States Patent Office 3,183,737
Patented May 18, 1965

3,183,737
EXPANSION COMPENSATED CONTROL SYSTEM
Allen S. Matz, Cornwells Heights, Pa., assignor to Teleflex Incorporated, North Wales, Pa., a corporation of Delaware
Filed May 14, 1962, Ser. No. 194,248
23 Claims. (Cl. 74—501.5)

The present invention relates to a remote control system which is constructed in such a way that the system remains unaffected by changes in length or deflections of the structure in which the system is mounted.

It is common in structures such as aircraft, boats or other vehicles of considerable length to utilize control systems in which an input device controlled by the operator is located in one position and an output device to be controlled by the operator is located in another position considerably remote therefrom. In the past, such remote control systems have normally been mounted to the structure in such a way that changes in length or deflections of the structure have unavoidably imposed large stresses on system components causing the system to either break or be otherwise damaged or to impart an undesired movement in the control system. An illustration of the problem with this latter occurrence would be in the remote control of an engine in which such change in length or deflection could increase or decrease engine speed when such was not intended by the operator.

While the general problem of structure deflection interfering with a remote control system may occur in numerous environments, one of the most critical areas where this is likely to occur is in aircraft where structural deflections and changes are rather common. One instance of this occurs where a throttle control is located in the cockpit and the engines to be controlled are located upon a wing. Deflections between a wing and a fuselage are common and in aggravated conditions, particularly in large aircraft, may be well in excess of several feet in magnitude at wing tip.

Another and very serious problem arises with supersonic aircraft where fuselage skin temperatures, caused primarily by air friction between the aircraft and the atmosphere, can reach a magnitude of several hundred degrees Fahrenheit in which event the overall length of the fuselage may increase many inches over its normal size. It is apparent that this change in fuselage size can seriously disrupt the aircraft control systems unless some means is provided for compensating therefor. In considering the matter of heat alone as a source of structural expansion or deflection, it is theoretically possible that the various structure and control system components might be made out of materials having matching thermal expansion characteristics. However, as a practical matter this is not a feasible approach to the problem in view of the greatly varying structural requirements of system components. Further, merely matching the thermal expansion characteristics of the various components would not take care of the problem of expansions or deflections induced by forces other than heat.

Accordingly, the present invention is directed to a unique control system in which the input and output members may be conveniently fixed to the structure in such a way as to accommodate expansions and deflections without in any way interfering with or jeopardizing the operation of the control system itself.

In general, the subject invention includes input and output devices interconnected through tubular means which, in turn, internally slidably support motion transmitting means suitably connected to rotatable members in each of the input and output devices. The input and output devices are fixed to the structure in which the control system is mounted and the present invention is specifically directed to the unique arrangement whereby the distance between the input and output devices may vary without stressing the control system or otherwise affecting the operation of the input and output devices.

One of the unique aspects of the present invention resides in the use of guide tube means, preferably metal, which are basically stiff enough to be load carrying and supporting members and yet which tube means will flex sufficiently and also coact with the motion transmitting means disposed therewithin to compensate for changes in the distance between the input and output devices without either stressing or changing the length of the motion transmitting member.

In one of the more important variations of the subject invention, the guide or supporting tube means is uniquely combined with pulley means to provide an extremely low friction system effectively providing for remote control over relatively long distances. In the modification utilizing pulley means in combination with the tube means, the system is uniquely constructed so that the pulley means are supported by the guide tube means and thus free for relative movement in relation to the structure to which the input and output devices are secured.

The details as well as other objects and advantages of the present invention will be apparent from a perusal of the detailed description which follows.

Figure 8:
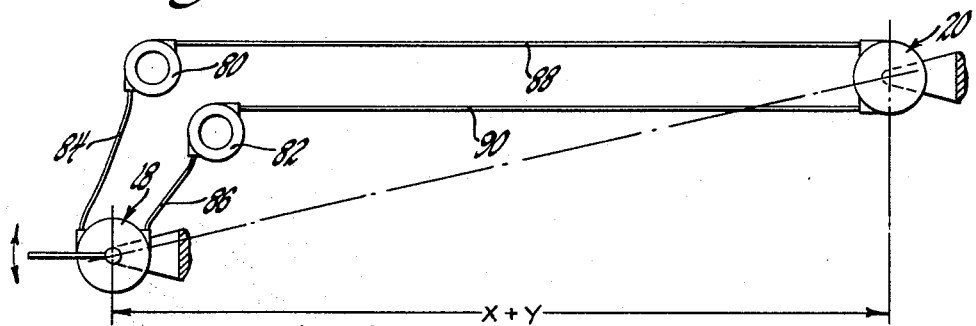
Figure 9:
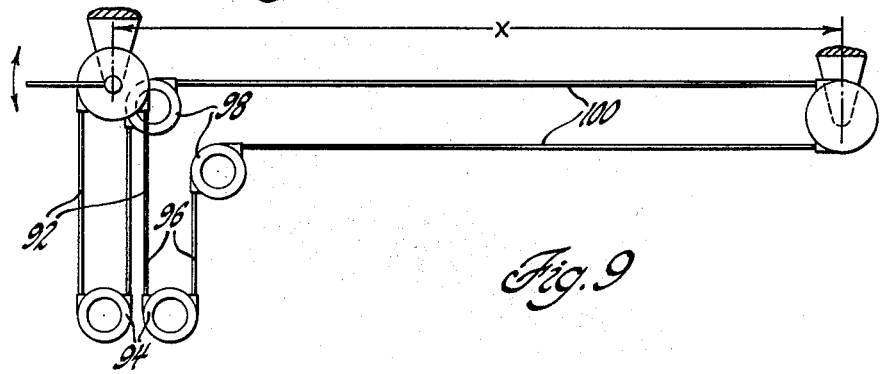
Figure 10:
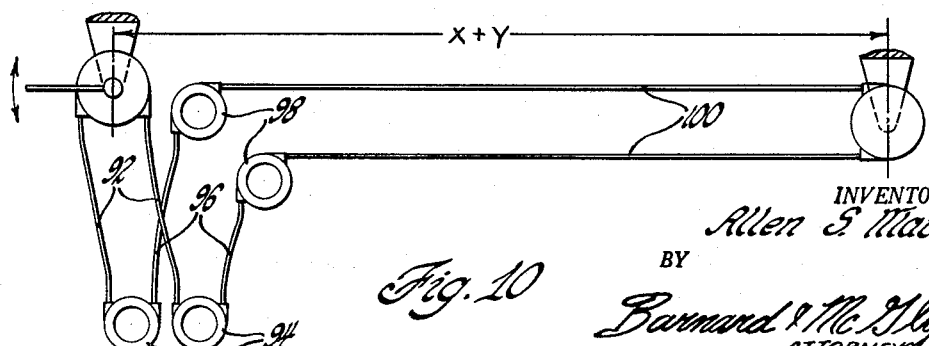

In the drawings:
FIGURE 1 is a perspective representation of the subject invention in a supersonic aircraft environment;
FIGURE 2 is a broken-away enlargement of the input device of FIGURE 1;
FIGURE 3 is a detailed sectional view of a portion of the system of FIGURE 1;
FIGURE 4 is a view along line 4—4 of FIGURE 3;
FIGURE 5 is a plan view of the system of FIGURE 1;
FIGURE 6 is a view along line 6—6 of FIGURE 5;
FIGURES 7 and 8 are unstressed and stressed representations of a modified form of the present invention;
FIGURES 9 and 10 are unstressed and stressed representations of another modification of the invention;
FIGURE 11 represents the manner in which the guide tubes are prestressed for mounting purposes.

As already suggested, the present invention is generally applicable to any structure in which a remote control system is utilized and where there is likely to be a change in distance between the input and output portions thereof whether induced by heat or other ambient operating conditions. For present purposes and to illustrate a use of particular significance, the present invention shows the subject control system applied to one type of aircraft.

In the first modification of the invention shown generally in FIGURES 1 through 6, the present invention is incorporated in a supersonic type aircraft where the expansion or deflection of the air frame structure is due primarily to the heat induced by the extremely high aircraft speeds. The subject control system may be utilized with aircraft which attain speeds in excess of 1500 miles per hour and in which the fuselage or air frame may expand or "grow" longitudinally in excess of one foot due to the skin temperatures which may range up to many hundreds of degrees Fahrenheit.

One of the very serious problems confronting any designer of a control system which may compensate for changes in the size of the basic structure in which it is embodied, and particularly in supersonic aircraft, is to provide a system which is both "expandable" and yet at the same time continues to provide extremely accurate control of the elements being operated thereby. To illustrate, a very simple way of compensating for expansion would be to provide a basically elastic motion transmitting member between the input and output devices which would simply stretch or expand with the expanding air frame. However, it is obvious that such an arrangement would be unsatisfactory due to the basic elasticity of the motion transmitting device. In other words, too large a portion of the input force or motion would be absorbed or lost in "stretching" system components before it would operate the output device.

Ideally, a remote control system should have a rigid connection between input and output to substantially eliminate backlash, windup or lost motion. However, the length and many other limitations frequently prevent the use of such rigid systems.

Thus, remote control system operating requirements, particularly in reference to aircraft, are rather severe in that the system must not contain excessive backlash, e.g. maximum input movement must be reflected in corresponding output movement, and additionally the system efficiency must be maintained at a high level, e.g. the input force must not be greatly diminished at the output end due to system friction. Therefore, the present invention is designed in a way to accommodate structural deflection and thermal expansion in a manner to maintain the overall system at a minimal weight, backlash, and at the same time maintaining maximum efficiency.

To further illustrate the severe operating requirements to which the subject system might be subjected, it has been designed to be applicable to a structure in which the input and output devices are in excess of a hundred feet apart and over which distance the control system is subjected to progressive temperature ranges along its length which may vary approximately as follows: minus 65° F. to plus 250° F., minus 65° F. to plus 450° F., and minus 65° F. to plus 650° F. In such an installation, the basic structure and hence the distance between the input and ouput devices may vary in excess of twelve inches due to heat-induced growth alone.

While numerous remote control systems have long been available and used in aircraft as well as other high performance environments, until the present invention no system has been available which can perform the intended functions and at the same time be of an extremely lightweight construction.

FIGURE 1 is a diagrammatic representation of one embodiment of the subject system as applied to a supersonic aircraft indicated generally at 10. Aircraft 10 includes front and rear wing sections 12 and 14. The particular aircraft illustrated is capable of flying at speeds in the Mach 2 or twice the speed of sound range. Accordingly, the temperature ranges, indicated along the side of the plane from front to rear, indicate those to which such an aircraft will be subjected. The first one-third of the air frame is in the minus 65° F. to plus 250° F. range, the middle third from minus 65° F. to plus 450° F. and the remaining third from minus 65° F. to plus 650° F. It is to be understood that these temperature ranges while approximate are indicative of the large thermal range to which such an aircraft may be subjected. With temperatures of the magnitude illustrated, the air frame may increase in length in excess of twelve inches.

A remote control system indicated generally at 16 is constructed and arranged in a manner to accommodate such expansion without affecting the system's operation.

Control system 16 includes an input device 18 adapted to be fixed to the air frame in the pilot-cockpit area. An output device 20 is similarly mounted at the rear of the aircraft. The particular mechanism being actuated by the control system is of no particular concern in the present invention. Aircraft control surfaces such as the elevators, rudder, etc., or engine controls may be satisfactorily manipulated by the subject system.

Before describing the details of the present system, it is to be noted that the system illustrated is in reality a double system, left and right, which is utilized for safety purposes particularly with military type aircraft where there is a high likelihood of combat damage. With such a double system the control system remains operative even though one side or the other may be damaged.

Since both sides of the system are identical only one side will be described. In the remaining illustrations also only single systems are shown although it is to be understood that double systems may be employed as desired.

Input device 18 includes a control handle or lever 22 suitably fixed to a shaft 24 to which at least one rotatable driving member is fixed. Flexible cables 26 and 28 are operatively connected to input device 18 and constitute parts of the means for transmitting motion from control handle 22 to output device 20. Output device 20, in turn, includes a rotatable member 30 fixed to an output or control shaft 32. Output shaft 32 is connected in any suitable manner to whatever mechanism is to be controlled by the subject system. An additional flexible cable portion 34 is wrapped through 180° around rotatable member 30 and, in a manner to be subsequently described, drives the rotatable member in response to actuation of control handle 22.

Before describing the various ways of constructing the subject system, the components utilized therewith will be described in detail.

Referring first to input device 18, as best seen in FIGURE 2, in this case a double input system right and left, is shown. Again since the systems are identical only that part of the input device for controlling a single system, the right, will be described. An enclosed casing 36 rotatably supports shaft 24 fixed to control lever 22. The rotatable input member may comprise a pair of sector members 38 and 40 fixed to shaft 24 for rotation therewith. Each sector includes a hobbed or contoured peripheral surface providing grooves adapted to receive corresponding convolutions of a driving wire closely wrapped about the outer periphery of the cables. The primary advantage of using the individual sectors is that they may be rotatably adjusted relative to each other to thereby vary the tension of the system. The inner ends of cables 26 and 28 are respectively anchored, through clips 42 to the sector members.

If desired, a single hobbed driving wheel may be used instead of the individual sector members 38 and 40. Thus, whether using the individual sectors or a single driving wheel, the cable portions 26 and 28 will constitute a 180° wrap relative to the rotatable input member.

Support or guide tubes 44 and 46 are pressed or otherwise retained within bosses 48 and 50 of casing 36. Cables 26 and 28 are slidably supported within guide tubes 44 and 46.

Output device 20 includes a similar casing 52 into which support or guide tubes 54 and 56 are pressed or otherwise mounted through bosses 58 and 60 and also slidably support cable 34.

As best seen in FIGURES 3 and 6, the free ends of guide tubes 44 and 46 are respectively pressed or otherwise secured to suitable bosses 62 of pulley devices 64 and 66. Similarly the free ends of guide tubes 54 and 56 are secured to pulley devices 64 and 66.

All of the guide tube means are made of relatively stiff tubular members and are sufficiently rigid in relation to their own and the weight of pulley devices 64 and 66 so as to support these devices without the latter being otherwise supported upon the air frame structure. At the same time, limited flexure is possible as the distance between the output and input members varies.

Pulley devices 64 and 66 are identical and, like other components, are of lightweight construction. Device 64 includes a non-rotatable ring or race member 68 which rotatably supports an outer ring or race member 70 upon rollers 72. Cable 26 runs on ring 70. Guide tube bosses 62 are suitably mounted to inner ring 68.

In the illustrated embodiment of the invention now under discussion, the distance between input device 18 and pulley devices 64 and 66 is relatively short, e.g. 3 feet, relative to the distance between the pulley devices and output device 20, e.g. 125 feet. Accordingly, cable portions 26 and 28 are directly slidably supported within guide tubes 44 and 46 and have an approximately 90° wrap around the rotatable rings 70 of each of the pulley devices 64 and 66.

On the other hand, the use of a flexible cable for the entire length of the distance between the pulley devices 64–66 and the rotatable member 30 of output device 20 would be undesirable from several points of view. First, such a flexible cable would have a considerable surface area contact with the guide tubes which would create a considerable frictional load to be overcome in transmitting motion from the input to the output devices. Secondly, a stranded cable has a relatively great stretch per unit of length as compared with a corresponding tube member. As a stranded cable of considerable length is loaded an undesirable elongation thereof takes place. In other words, an undesirable amount of the rotary movement of the input handle 22 would be dissipated between the pulley devices and the output device in taking up cable stretch.

For these reasons, it is preferred to combine the flexible cables 26, 28 and 34 with a lightweight load transmitting tubular member 74 slidably mounted in each of the guide tubes 54 and 56. Sufficient length of flexible cable is provided to accommodate the full range of movement of the same about input sectors 38 and 48, pulley devices 64 and 66 and rotatable member 30 of output device 20. The ends of load transmitting tubes 74 are swaged over the ends of the flexible cables with sufficient force to prevent separation of the tubes and cables.

Referring to FIGURES 3 and 4, to minimize the sliding friction of tubular load transmitting members 74 within the guide tubes 54 and 56, it is preferred to periodically support the tubular means upon sets of radially disposed glide buttons 76. The sets of glide buttons 76 are spaced every 12 to 18 inches along the length of the guide tubes.

One manner of mounting the glide buttons is to provide a plurality of circumferentially spaced holes about the periphery of the guide tubes and through which holes the buttons are adapted to project radially inwardly. The buttons themselves may be retained in position by a suitable annular collar 78.

In the temperature areas up to 450° F. the glide buttons may be formed of a low frictional plastic material such as Teflon. In the temperature areas above 450° F., the glide buttons should be made of stainless steel coated with a solid film dry lubricant applied to the surface adapted to support the load transmitting tubes 74. FIGURE 4 indicates the manner in which the load transmitting tubes are radially supported upon glide button sets 76.

Reference is now particularly made to FIGURES 7 through 10 which illustrate variations of the basic system shown in FIGURE 1 and which variations are shown in both the unexpanded and expanded condition. In these diagrammatic representations, the lines connecting the input and output devices with the various floating pulley members represent the guide tubes within which the cable members and load transmitting tubes are slidably supported.

The modification of FIGURES 7 and 8 is also of the offset type as generally shown in FIGURES 1 through 6. The meaning of offset in this sense simply means that instead of the input and output devices being longitudinally aligned, the input member is offset toward the center. In contrast to the offset arrangement of FIGURES 1 through 8, an in-line arrangement is shown in FIGURES 9 and 10. In the latter instance the input and output members are substantially longitudinally aligned.

The primary difference between the arrangement of FIGURE 7 as compared with that of FIGURE 5 is that by offsetting the pulley devices 80 and 82, the guide tubes 84 and 86 between the input device and the pulley devices as well as the guide tubes 88 and 90 between the pulley devices and the output devices may be made parallel to each other rather than inclined in the first modification.

In FIGURE 7 the remote control system is shown in an unexpanded condition in which the distance between the input and output devices is represented by the letter $x$. In FIGURE 8, the structure in which the remote control system is mounted has been expanded in an amount equal to that represented by the letter $y$. As will be seen in FIGURE 8, the structure expansion is compensated in the control system by simply flexing the guide tubes and in which case there is substantially no change in the length in the motion transmitting means as it extends from the input device 18 around pulley devices 80 and 82 to actuate output device 20.

Where the in-line arrangement of FIGURES 9 and 10 is desired, it becomes necessary to add an additional set of pulley devices. In this case, input device 18 is aligned with output device 20. A first set of guide tubes 92 extend generally normally to a line of centers between the input and output devices and connect at their free ends with a first set of pulley devices 94. A second set of guide tubes 96 extend parallel to the first set of guide tubes and also connect at one end with pulley set 94. The other end of guide tubes 96 connect with another pair of pulley devices 98. A third set of parallel guide tubes 100 connect with pulley devices 98 at one end and to output device 20 at the other end. The control system as shown in FIGURE 9 is unexpanded and the distance between the input and output devices is represented again by the numeral $x$. In FIGURE 10 the control system is now expanded by an amount represented by the letter $y$ with the increased length being absorbed by the flexure of the guide tube sets 92 and 96.

While there is a practical limit in the amount of flexure that may be imposed on the guide tubes disposed between the input device and the pulley devices, in general, the greater the expansion of the structure mounting the control system, the greater should be the length of the flexing guide tubes. As already noted, in the illustrative system shown the distance between the input and output devices is approximately 125 feet while the distance between the input device and at least one set of pulleys is approximately 3 feet. This general relationship will adequately accommodate approximately 15 inches of linear expansion between the input and output devices. In the event still greater longitudinal expansion had to be accommodated, this could be done by simply increasing the length of the flexing guide tube members an appropriate amount.

By prestressing the flexing guide tube means, the amount of longitudinal expansion which can be accommodatd in one direction can be considerably increased. Reference is now made to FIGURE 11 where a portion of a control system is shown and includes an input device 18, a pulley device 102 and an interconnecting guide tube means 104. Assuming that a particular length of guide tube means can only be flexed through a predetermined angle safely within the elastic limit of the material and that this angular movement represents one-half of the total longitudinal distance, $y$, to which the system is to be subjected. Starting from a neutral position indicated at a, the system is installed within the mounting structure so as to prestress or flex the guide tube means in the opposite direction from which normal expansion will occur until the tube and pulley are moved to the position indicated at b. Thus guide tube 104 is prestressed through a distance equal to y/2 or one-half of the total expansion contemplated. In this way as the structure expands, the flexure of guide tube 104 back to point a will merely represent an unstressing of the tube with the remainder of the expansion to a position c representing a stressing or flexing of the tube for another distance equal to y/2. To illustrate with a numerical example: assume the distance y equals 15 inches, then in installing the remote control system flexible guide tube 104 is prestressed in a counterclockwise direction 7½ inches to position b. Thereafter, as expansion of the structure occurs the first 7½ inches of movement of the guide tube means in a clockwise direction will return the tube to an unstressed position, a, after which continued expansion will take place through the remaining 7½ inches of travel. In this way, either twice the distance of expansion may be achieved for a predetermined length of guide tube means or one-half the amount of stressing may take place.

Static and dynamic friction forces can create appreciable loads in remote control systems employing relatively sliding members. These frictional forces decrease the system's efficiency and increase backlash both being undesirable results. However, the subject control system uniquely utilizing flexing and closed guide tubes to support the motion transmitting means, i.e. cables and load tubes, permits a further combination of elements to improve operation of the system. To this end, a pulsator 106 is fixed to the control system at a convenient place to induce controlled vibrations into the system. As shown in FIGURES 1 and 2, pulsator 106 is mounted on casing 36 of input device 18. Input lever 22 can be so arranged to electrically energize the pulsator at any time the lever is moved.

The basically unique approach of the subject invention in using relatively rigid guide tube means which are supported primarily only at the input and output devices combined with pulsator 106 makes possible a highly efficient remote control system. The use of pulsator 106 substantially eliminates static friction and increases low-load efficiencies by as much as one hundred and fifty percent (150%).

Pulsator 106, per se, constitutes no part of the subject invention and may be selected from those presently commercially available at very low cost.

It is to be understood that further modifications and variations of the subject invention may be realized within the intended scope of the invention as set forth in the hereinafter appended claims.

I claim:
1. An expansion compensated control system comprising a structure, a power input device fixed to said structure, a power output device fixed to said structure at a position remote from said input device, said structure being subjected to ambient operating conditions adapted to cause the distance between said devices to vary, said input and output devices each including a rotatable member, continuous pulley support means, first tube means connected between said input device and said pulley support means, second tube means connected between said pulley support means and said output device, at least a part of said pulley support means being substantially offset relative to a line-of-centers between the rotatable members of said input and output devices, said pulley support means being connected to said structure only through said first and second tube means, at least one of said tube means being permitted to flex during a change in distance between said devices, and motion transmitting means secured at one end to the rotatable member of the input device and at the other end to the rotatable member of the output device, said motion transmitting means being slidably supported within said first and second tube means and the length thereof being substantially unchanged by flexure of said tube means.

2. The control system set forth in claim 1 wherein said first tube means is preflexed in a direction opposite to the direction of flexure caused by said ambient operating conditions a distance equal to one-half the maximum amount of flexure of said first tube means as a result of said ambient operating conditions.

3. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, tube means connecting said input and output devices and including at least a portion offset from a line-of-centers between said rotatable members, and motion transmitting means slidably disposed within said tube means and respectively secured at its ends to the rotatable members of the input and output devices, said offset portion of said tube means being such as to flex during a change in the distance between said devices leaving the length of said motion transmitting means substantially unaffected.

4. A remote control system as set forth in claim 3 which includes a pulsator for inducing controlled vibrations into said tube means.

5. A remote control system as set forth in claim 3 in which said input device includes an enclosed casing, a shaft rotatably supported in said casing, the rotatable member of said input device being fixed to said shaft and disposed within said casing, and an actuating lever fixed to said shaft.

6. A remote control system as set forth in claim 5 in which the rotatable member of the input device comprises a pair of sector elements adjustably mounted on said shaft, said motion transmitting means being connected to said sector elements whereby relative rotary adjustment of said sectors varies the tension of the motion transmitting means.

7. A remote control system as set forth in claim 5 in which said tube means are supported at one end within the casing of said input device, and a pulsator mounted on said casing for inducing-controlled vibrations into said tube means.

8. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, elongated means respectively secured at its ends to the rotatable members of the input and otuput devices to transmit movement between said devices, tube means connected between said devices and slidably supporting said elongated means therewithin, said tube means including at least a portion substantially offset from a line-of-centers between said rotatable members whereby said offset portion may flex during a change in the distance between said devices leaving the length of the motion transmitting means substantially unaffected by said distance change.

9. The remote control system set forth in claim 8 wherein said portion of said tube means offset from said line of centers between said rotatable members is initially preflexed in a direction opposite to the direction of flexure as a result of said ambient operating conditions and an amount equal to one-half the maximum amount of flexure caused by said ambient operating conditions.

10. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, tube means fixed to said input and output devices to provide an enclosed path between said devices and including at least a portion offset from a line-of-centers between said rotatable members, and motion transmitting means slidably disposed within said tube means and respectively secured at its ends to the rotatable members of the input and output devices, said offset portion of said tube means being such as to flex during a change in the distance between said devices leaving the length of said motion transmitting means substantially unaffected.

11. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, first tube means fixed to said input and output devices, second tube means fixed to said devices and spaced from the first tube means, said first and second tube means providing a pair of enclosed paths between said devices, and motion transmitting means slidably disposed within said first and second tube means, said motion transmitting means including cable portions drivingly coacting with said rotatable members, said first and second tube means each including at least one portion offset from a line-of-centers between said rotatable members whereby the distance between said members may vary without thereby varying the lengths of said first and second tube means.

12. A remote control system as set forth in claim 11 which includes means for inducing controlled vibrations into said portion of the system slidably supporting the motion transmitting means whenever the input device is operative.

13. A remote control system as set forth in claim 11 in which said motion transmitting means includes tube elements slidably supported in said first and second tube means, said tube elements being connected to said cable portions for movement therewith.

14. A remote control system as set forth in claim 13 in which the first and second tube means include a plurality of longitudinally spaced bearing means for slidably supporting the tube elements.

15. A remote control system as set forth in claim 14 in which each bearing means comprises a plurality of radially spaced members engaging the peripheral surface of the associated tube element.

16. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, elongated means respectively secured at its ends to the rotatable members of the input and output devices to transmit movement between said devices, tube means connected between said devices and slidably supporting said elongated means therewithin, said tube means including at least a portion offset from a line-of-centers between said rotatable members, said offset portion being adapted to flex during a change in the distance between said devices whereby the length of said tube means remains substantially constant.

17. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, tube means connecting said input and output devices, said tube means comprising a plurality of leg portions and at least one of said leg portions being angularly offset with respect to an adjacent leg portion, and continuous pulley support means supported by the tube means at the junction of said one leg portion and an adjacent leg portion and coacting therewith to guide said motion transmitting means, said offset portion of said tube means being such as to flex during a change in the distance between said devices leaving the length of said motion transmitting means substantially unaffected.

18. A remote control system as set forth in claim 10 in which said tube means comprises a plurality of linear leg portions, angularly-related of said linear leg portions being connected by said pulley support means.

19. A remote control system as set forth in claim 17 in which said input device is angularly offset from a line-of-centers between said pulley support means and said output device.

20. A remote control system as set forth in claim 17 in which said input device is substantially perpendicularly offset from a line-of-centers between said pulley support means and said output device.

21. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, tube means connecting said input and output devices, said tube means including a pair of adjacent leg portions angularly inclined to a line-of-centers between said rotatable members, and continuous pulley support means supported by adjacent ends of said leg portions and coacting therewith to guide the motion transmitting means, at least one of said leg portions being adapted to flex during changes in the distance between said devices without affecting the length of the motion transmitting means.

22. A remote control system comprising a structure, a power input device fixed to said structure, a power output device fixed to said structure at a position remote from the input device, said structure being subjected to ambient operating conditions adapted to cause the distance between said devices to vary, said input and output devices each including a rotatable member, a first continuous pulley support means disposed intermediate the input and output devices, a second continuous pulley support means disposed intermediate said first pulley support means and one of said devices, said second pulley support means being substantially offset from the input and output devices and first pulley support means, tube means interconnecting said devices and said first and second pulley support means whereby said first and second pulley support means are supported by said tube means, and motion transmitting means respectively connected to the rotatable members of the input and output devices, said motion transmitting means being slidably supported within said tube means and coacting with said pulley support means to transmit motion betwen said input and output devices.

23. The remote control system set forth in claim 22 wherein said tubular means between said input device and said first pulley means and between said pulley means and said second pulley means are preflexed in a direction opposite to the direction of flexure caused by said ambient operating conditions and an amount equal to one-half the maximum amount of flexure caused by said ambient operating conditions.

References Cited by the Examiner
UNITED STATES PATENTS 715,356  12/02  De Vito _____ 64—2
1,983,962  12/34  Barber et al. _____ 74—504

(Other references on following page)

UNITED STATES PATENTS

| | | | |
|---|---|---|---|
| 2,585,358 | 2/52 | Weber | 74—501.5 |
| 2,928,338 | 3/60 | Wockenfuss | 74—501 X |
| 2,961,986 | 11/60 | Rockhill | 74—498 X |
| 3,031,865 | 5/62 | Weasler | 64—3 |
| 3,050,025 | 8/62 | Atkeson | 114—144 |
| 3,068,718 | 12/62 | Adler | 74—501 |
| 3,078,015 | 2/63 | Wahl | 259—1 X |
| 3,088,330 | 5/63 | Thompson | 74—501 |
| 3,122,942 | 3/64 | Kompanek et al. | 74—501 |
| 3,129,605 | 4/64 | Bonnell et al. | 74—512 X |

FOREIGN PATENTS

| | | |
|---|---|---|
| 991,087 | 6/51 | France. |
| 1,173,317 | 10/58 | France. |
| 424,814 | 2/35 | Great Britain. |
| 819,398 | 7/37 | Great Britain. |

BROUGHTON G. DURHAM, *Primary Examiner*.